(12) United States Patent
Etter

(10) Patent No.: US 9,347,682 B2
(45) Date of Patent: May 24, 2016

(54) DYNAMIC DOUBLE-CIRCUIT IN-LINE HEATER

(75) Inventor: Stefan Etter, Kehrsatz (CH)

(73) Assignee: Nestec S.A., Vevey (CH)

( * ) Notice: Subject to any disclaimer, the term of this patent is extended or adjusted under 35 U.S.C. 154(b) by 97 days.

(21) Appl. No.: 13/698,582

(22) PCT Filed: May 20, 2011

(86) PCT No.: PCT/EP2011/058248
§ 371 (c)(1),
(2), (4) Date: Nov. 16, 2012

(87) PCT Pub. No.: WO2011/144733
PCT Pub. Date: Nov. 24, 2011

(65) Prior Publication Data
US 2013/0064529 A1    Mar. 14, 2013

(30) Foreign Application Priority Data

May 21, 2010  (EP) .................................. 10163652

(51) Int. Cl.
| F24H 1/10 | (2006.01) |
| H05B 3/78 | (2006.01) |
| F24H 1/16 | (2006.01) |
| F24H 9/20 | (2006.01) |
| A47J 31/54 | (2006.01) |

(52) U.S. Cl.
CPC ............... *F24H 1/162* (2013.01); *A47J 31/545* (2013.01); *F24H 9/2028* (2013.01)

(58) Field of Classification Search
USPC .................................................. 392/465–496
See application file for complete search history.

(56) References Cited

U.S. PATENT DOCUMENTS

| 4,138,936 | A | * | 2/1979 | Williams .......................... 99/282 |
| 4,208,957 | A | * | 6/1980 | Bollman et al. ................. 99/282 |
| 4,224,503 | A | * | 9/1980 | Gijzel et al. ..................... 392/480 |
| 4,343,988 | A | * | 8/1982 | Roller et al. .................... 392/467 |
| 4,356,382 | A | * | 10/1982 | Keramati et al. ............. 392/471 |
| 4,459,465 | A | | 7/1984 | Knight |
| 4,604,515 | A | | 8/1986 | Davidson |
| 6,080,971 | A | | 6/2000 | Seitz et al. |
| 6,782,195 | B2 | * | 8/2004 | Abras et al. .................... 392/480 |
| 6,912,357 | B2 | * | 6/2005 | Bissonnette et al. .......... 392/465 |
| 6,915,070 | B1 | * | 7/2005 | Lee .................................. 392/481 |

FOREIGN PATENT DOCUMENTS

| CH | 416019 | 6/1966 |
| DE | 3540830 | 5/1986 |

(Continued)

OTHER PUBLICATIONS

Written Opinion of the International Searching Authority for PCT/EP2011/058248 mailing date Dec. 17, 2012—5 pages.

(Continued)

*Primary Examiner* — Thor Campbell
(74) *Attorney, Agent, or Firm* — K&L Gates LLP

(57) ABSTRACT

A dynamic double-circuit in-Line heater is disclosed, as well as a machine containing the heater and a method of operating the machine.

6 Claims, 3 Drawing Sheets

(56) References Cited

FOREIGN PATENT DOCUMENTS

| | | |
|---|---|---|
| DE | 19732414 | 2/1999 |
| EP | 0636333 | 2/1995 |
| GB | 1107867 | 3/1968 |
| JP | 2007501506 | 1/2007 |
| JP | 2008523879 | 7/2008 |
| WO | 2005045327 | 5/2005 |
| WO | 2005064243 | 7/2005 |
| WO | 2006099503 | 9/2006 |

OTHER PUBLICATIONS

International Search Report for PCT/EP2011/058248 mailing date Dec. 17, 2012—3 pages.

European Office Action for Application No. 11 720 770.4-1602, dated May 19, 2015, 5 pages.

Japanese Office Action for Application No. P2013-510636, Dispatch No. 200670, dated May 12, 2015, 8 pages.

* cited by examiner

DYNAMIC DOUBLE-CIRCUIT IN-LINE HEATER

CROSS REFERENCE TO RELATED APPLICATIONS

The present application is a National Stage of International Application No. PCT/EP2011/058248, filed on May 20, 2011, which claims priority to European Patent Application No. 10163652.0, filed on May 21, 2010, the entire contents of which are being incorporated herein by reference.

FIELD OF THE INVENTION

The field of the invention pertains to in-line heaters, in particular heaters used in beverage preparation machines, such as machines for preparing beverages by circulating a heated fluid through a capsule containing an ingredient, typically a flavouring ingredient, of the beverage to be prepared.

For the purpose of the present description, a "beverage" is meant to include any liquid food, such as tea, coffee, hot or cold chocolate, milk, soup, baby food, etc. . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water are also well known and are for example disclosed in CH 593 044, DE 103 22 034, DE 197 32 414, DE 197 37 694, EP 0 485 211, EP 1 380 243, FR 2 799 630, U.S. Pat. No. 4,242,568, U.S. Pat. No. 4,595,131, U.S. Pat. No. 5,019,690, U.S. Pat. No. 5,392,694, U.S. Pat. No. 5,943,472, U.S. Pat. No. 6,393,967, U.S. Pat. No. 6,889,598, U.S. Pat. No. 7,286,752, WO 01/54551 and WO 2004/006742.

More particularly, CH 593 044 and U.S. Pat. No. 4,242,568 disclose a coffee machine with an inline thermoblock heater having a metal mass with resistive heating cable cast in the mass and with a duct for the circulation of water to be heated.

Thermoblocks are in-line heaters through which a liquid is circulated for heating. They comprise a heating chamber, such as one or more ducts, in particular made of steel, extending through a (massive) mass of metal, in particular made of aluminium, iron and/or another metal or an alloy, that has a high thermal capacity for accumulating heat energy and a high thermal conductivity for the transfer the required amount of the accumulated heat to liquid circulating therethrough whenever needed. Instead of a distinct duct, the thermoblock's duct may by a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct(s) may have a helicoidal or another arrangement along the thermoblock to maximise its/their length and heat transfer through the block.

A drawback of thermoblocks lies in the difficulty to accurately control the temperature and optimise the required heating energy for bringing the liquid to be heated to the desired temperature. Indeed, the thermal inertia of the metal mass, the localised and uneven resistive heating of the mass, the dynamic heat diffusion from the heating in the mass to different parts of the mass affecting the measured temperature of the mass at predetermined locations make an accurate control of the thermoblocks to heat the circulating liquid to a desired predetermined temperature quite difficult and moreover requires quite long pre-heating periods, typically of 1 to 2 min in the case of espresso machines. Furthermore, it is difficult to predict various parameters involving the subsequent use of the thermoblock produced in series, e.g. the temperature of the environment, the net voltage of the mains, the actual value of the heating resistor of the thermoblock, thermal insulation of the thermoblock, the initial temperature of the liquid circulated through the thermoblock, etc. . . . Consequently, thermoblocks are usually associated with dynamic loop-controlled powering circuit tailoring the powering of the thermoblock with continuous measuring of the temperature. However, due to the complex thermal flow of such a system, the stabilisation of the thermoblock at a certain temperature level adjusted to the heating needs of the flow of liquid to be circulated is lengthy and still difficult to achieve.

An approach to improve the heating accuracy is taught in EP 1 380 243. This patent discloses a heating device intended in particular to equip coffee machines. This heating device comprises a metal tube through which the liquid that is to be heated can flow from an inlet duct to an outlet duct. The exterior surface of the tube is covered over several sections of its length with a plurality of sets of electric resistive elements in series. A cylindrical insert extends inside the tube to form, with the interior wall of the tube, a helical duct through which the liquid can circulate and which thus encourages turbulent flow and rapid transfer of energy from the tube to the liquid. A flowmeter is also positioned upstream of the inlet duct. The device further comprises a plurality of temperature sensors distributed along the length of the tube at the entry to and exit from each set of resistive elements. The principle governing the distribution of heating energy to the liquid in this instance is based on modulating the electrical power produced by the resistive elements which can be switched independently of one another or in series according to the water temperature at the inlet to the duct. Although this device gives results which are satisfactory in terms of the speed of heating, this device is relatively bulky in that the volume of water to be heated determines the height of the tube.

Furthermore, the accuracy with which the liquid temperature is regulated is limited by the fact that the liquid does not come into direct contact with the sensors which are positioned outside the tube. The rate of response to temperature differences, due to the inertia of the liquid that is to be heated, is also slower, and this detracts from the accuracy with which the temperature can be regulated. It should also be noted that the proximity of the temperature sensors to the sets of resistive elements runs the risk of influencing the measurement in an uncontrollable manner because of the thermal conduction that occurs through the wall of the tube.

In addition, more or less complex attempts to improve the thermal control of heaters for batch or in-line low inertia heaters have been proposed in DE 197 11 291, EP 1 634 520, U.S. Pat. No. 4,700,052, U.S. Pat. No. 6,246,831.

There is still a need to provide a simple and reliable heater for a fast pre-heating thereof for accurately heating a liquid circulated therethrough during normal use and under various conditions of use.

SUMMARY OF THE INVENTION

The invention thus relates to an inline heater, as well as to a machine for preparing a beverage containing such a heater and to a method for controlling such a heater to prepare a beverage.

Water for preparing hot beverages in a corresponding machine, in particular an espresso coffee machine water should be heated from tap temperature, e.g. 10 to 30° C., to brewing temperature, e.g. 80 to 100° C. A short heat up time of the machine is a major advantage for the customer.

An object of the invention is to provide a heater with a low thermal mass for decreasing heat up times, but as well to respect the beverage requirements, e.g. espresso beverage, for the water temperature regulation. Furthermore the Flicker standards (IEC regulation) are limiting the possibilities to regulate the heater.

Another object is to stay within this three basic requirements: fast heat up, regulation quality, Flicker.

Another object is to provide a balanced solution between a fast heat up determining a low thermal mass, and a reliable regulation which furthermore determines a high dynamic thermo regulation.

One or more of these objects are met by a heater, a device or a method according to the independent claim(s).

The dependent claims further provide solutions to these objects and/or additional benefits.

According to a first aspect, the invention relates to an in-line heater for a liquid food or beverage preparation machine, in which machine liquid is circulated through said heater and then guided into a brewing chamber for brewing a food or beverage ingredient supplied into said brewing chamber. It comprises:
  a body incorporating an inlet, an outlet and a heating chamber extending therebetween, said inlet, outlet and heating chamber forming together a rigid passage for guiding said liquid circulating through said body; and
  a heating means cooperating with the body for supplying heat into said heating chamber.

The heating means comprises at least two heating elements and electrical control circuits for activating and deactivating each heating elements independently.

The heating power of each heating elements may be sensibly identical. The body can be made of aluminium.

The rigid passage is for example an inox water pipe embedded in the body, a coated liquid channel formed in the body.

The heating means may comprise a resistive heating means such as a thick-film, the resistive heating means comprising at least two resistive heating circuits, adapted to be coupled to the electrical control circuits. The thick film can be printed on an inox plate which is soldered to the body.

The heating means may comprise a heat cartridge and a wrapped heat cartridge.

The heating means may comprise a heat cartridge and a thick film heater.

According to a second aspect, the invention relates to a liquid food or beverage preparation machine comprising a heater according to the first aspect, in particular a machine for the preparation of a liquid food or beverage, such as soup, tee and/or coffee, by brewing a food or beverage ingredient that may optionally be contained in capsule or a pod.

According to a second aspect, the invention relates to a Method for controlling a heater according to the first aspect, wherein the heating elements are activated or deactivated independently by switching on and off the electrical control circuits, so as to avoid simultaneous switching on or off of both heating elements for respecting the Flicker standards.

The flow through (in-line) heater of the invention may be made of an aluminium body with an integrated water circuit (e.g. in a molded inox water pipe) and a thickfilm or surface heating element, which is connected to the aluminium body. This connection is designed for optimal heat transfer, for good mechanical stability and for taking the forces, which result from the different thermal length dilatations of aluminium body and thickfilm plate. Furthermore the corrosion problematic has to be solved. The body, e.g. aluminium, has a sufficient thermal capacity to dampen energy variations. This capacity is though limited to minimise the heat-up time at start-up from room or rest temperature.

For not penalizing the Flicker standards a split of the heat power to multiple (typically 2 for the espresso applications, e.g. prepared from a capsule such as a Nespresso capsule), and heat circuits are needed The heater may have the following characteristics:
F low through principle
Water heater for water flows of 0 up to 3.5 ml/s
Flow gradients max. 6 ml/s^2
Water in temperature 10-30° C.
Water out temperature 80 to 95° C.
Water mass in heater below 15 g
Two resistive heating circuits printed on a thickfilm plate, with a total power of about 1200 W
Power split of heat circuits between 300 W/900 W up to 600 W/600 W possible
Heat density in Inox water pipe: 0.1 W/mm^2→no steaming up to 95° C. max. temperature of water outlet
Two Layer Helical Water Pipe
Heat up time from 20° C. to 90° C. below 20 s (ready for coffee brewing)
Power rate for heat up (power/gramm of total heater mass): over 5 W/g
Quality of thermo regulation in steady state use: +/−2° C.

BRIEF DESCRIPTION OF THE DRAWINGS

The invention will now be described with reference to the schematic drawings, wherein.

DETAILED DESCRIPTION

Figure 1:
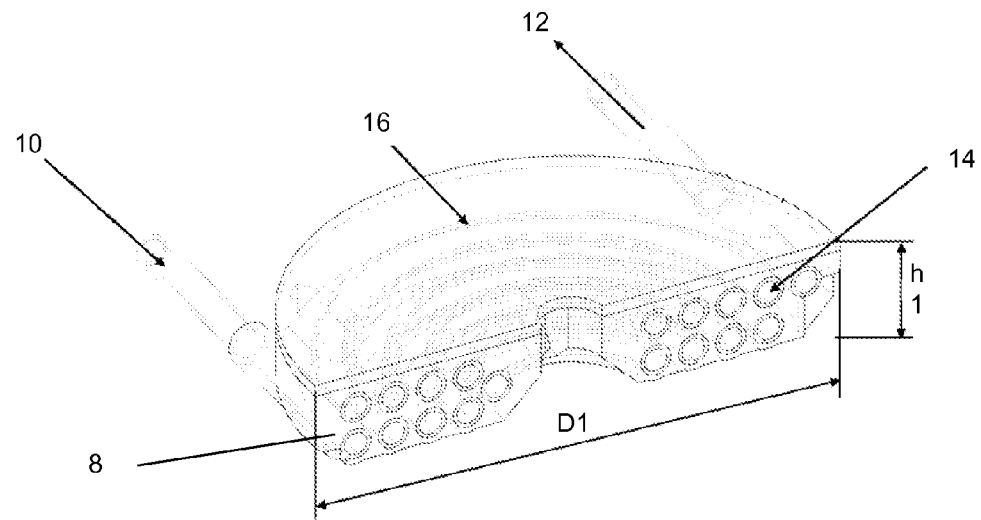
FIGS. 1 to 4 show various details of a heater according to the invention.

A beverage preparation machine can be electrically powered, typically by the mains, via an electric cord.

The machine has an internal beverage preparation module covered by a housing. The beverage preparation module is arranged for holding a flavouring ingredient, in particular a pre-portioned ingredient such as an ingredient supplied to such module within a capsule, and circulating a liquid therethrough to form the beverage.

The liquid, e.g. water, may be stored and supplied to the beverage preparation module from a tank. The beverage, upon formation, can be dispensed via an outlet to a dispensing area, e.g. a support for holding a user cup or mug. The dispensing area may include a first cup support, e.g. a support for espresso cups, that is movable away from under outlet so as to give access to a lower second cup support for larger cups or mugs, e.g. for dispensing lungos or extra-large beverages. The lower cup support may be connected to a base of machine. Suitable movable cup supports are for example disclosed in EP 1867260 and in WO 2009/074557, the contents of which are hereby incorporated by way of reference.

The machine also includes a steam and/or hot water generator for delivering such steam and/or hot water via an opening of tube, e.g. for the preparation of frothed milk and/or tea.

Adjacent to the beverage preparation module, machine may have a collector for used flavouring ingredient, e.g. ground coffee or tea upon brewing, for instance contained within capsules. Collector may be positioned underneath the beverage preparation module to collect upon beverage preparation the used flavouring ingredient evacuated to collector, e.g. by gravity. Suitable collectors are for example disclosed in WO 2009/074559 and in WO 2009/135869, which are hereby incorporated by way of reference.

The machine has a handle movable between: a transfer position for loading the ingredient, e.g. within a capsule, into the module and/or evacuating such ingredient from the module; and a circulation position for circulating the liquid through the ingredient.

Typically, handle actuates an ingredient holder with an ingredient chamber, such as a brewing unit, of the beverage preparation module from: a transfer position (not shown) for insertion of the flavouring ingredient into the holder and/or evacuation of this ingredient therefrom; and a circulation position for circulating the liquid through this ingredient in the ingredient holder to form the beverage. Typically, the ingredient holder, e.g. a brewing unit, has two relatively movable parts that are moved apart for opening the ingredient holder into the transfer position and moved together for closing the ingredient holder into the circulation position. In the circulation position (not shown), the ingredient holder may tightly enclose the flavouring ingredient to ensure proper guidance of the liquid through the ingredient.

In the circulation position, the handle may rest on or in a top face of machine. In particular the handle can be flush with the housing.

Furthermore, the machine includes a user-interface for initiating circulation of the liquid through the flavouring ingredient in the beverage preparation module.

The beverage preparation module typically includes one or more of the following components:

a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet;

b) an in-line heater for heating this flow of liquid to be supplied to the ingredient holder;

c) a pump for pumping this liquid through the in-line heater;

d) one or more fluid connecting members for guiding this liquid from a source of liquid, such as tank of liquid, to beverage outlet;

e) an electric control unit, in particular comprising a printed circuit board (PCB), for receiving instructions from a user via an interface and for controlling the in-line heater and the pump; and f) one or more electric sensors for sensing at least one operational characteristic selected from characteristics of the ingredient holder, the in-line heater, the pump, liquid reservoir, ingredient collector, a flow of this liquid, a pressure of this liquid and a temperature of this liquid, and for communicating such characteristic(s) to the control unit.

An inline heater according to an embodiment is illustrated on FIG. 1. The inline heater comprises a body 8 with an integrated water circuit. The body 8 may be made of aluminium: the aluminium body has a sufficient thermal capacity to dampen energy variations, though limited to minimise the heat-up time at start-up from room or rest temperature.

The water circuit comprises a liquid inlet 10, a liquid outlet 12, and a liquid pipe 14 in-between fluidically connecting the inlet to the outlet. The water pipe can be formed by a molded inox water pipe embedded in the body. The water pipe can also be formed by a coated liquid channel formed in the body. The external shape of the body illustrated on FIG. 1 is a cylinder, with a diameter D1 of 75 mm and a height h1 of 16 mm, having one of its ends covered by a surface heating element 16. The heater comprises a surface heating element 16 that is thermally and mechanically coupled to the body. Typically, the surface heating element 16 is a thick film. In particular, the thick film may be printed on an inox plate which is soldered to the aluminium diecast body. This coupling is designed for optimal heat transfer, for good mechanical stability and for taking the forces, which result from the different thermal length dilatations of aluminium body and thick film plate.

The surface heating element 16 comprises at least two heat circuits. Each heat circuit has a separate control circuit, so as to allow the activation/deactivation of said heat circuit independently of the others heat circuits. Each heat circuit is capable of delivering an heating power that is smaller than the heating power that the surface heating element is capable of delivering. As a consequence, a split of the heat power to multiple (typically 2 for the espresso applications, e.g. prepared from a capsule such as a Nespresso capsule) can be obtained to follow the Flicker standards. The power split between the two heating circuits can be a 50%/50% repartition of the heating power between the circuits, or any repartition from 15%/85% to 85%/15%. The total heating power of the surface heating element is typically comprised between 600 W and 2000 W.

More particularly, the heater may have the following characteristics:

Flow Through Principle

Water heater for water flows of 0 up to 3.5 ml/s

Flow gradients max. 6 ml/s$^2$

Water in temperature 10-30° C.

Water out temperature 80 to 95° C.

Water mass in heater below 15 g

Two resistive heating circuits printed on a thickfilm plate, with a total power of about 1200 W Power split of heat circuits between 300 W/900 W up to 600 W/600 W possible Heat density in Inox water pipe: 0.1 W/mm^2, allowing no steaming up to 95° C. maximum temperature of outlet Two Layer Helical Water Pipe Heat up time from 20° C. to 90° C. below 20 s (ready for coffee brewing)

Power rate for heat up (power/gramm of total heater mass): over 5 W/g

Quality of thermo regulation in steady state use: +/−2° C.

Figure 2:
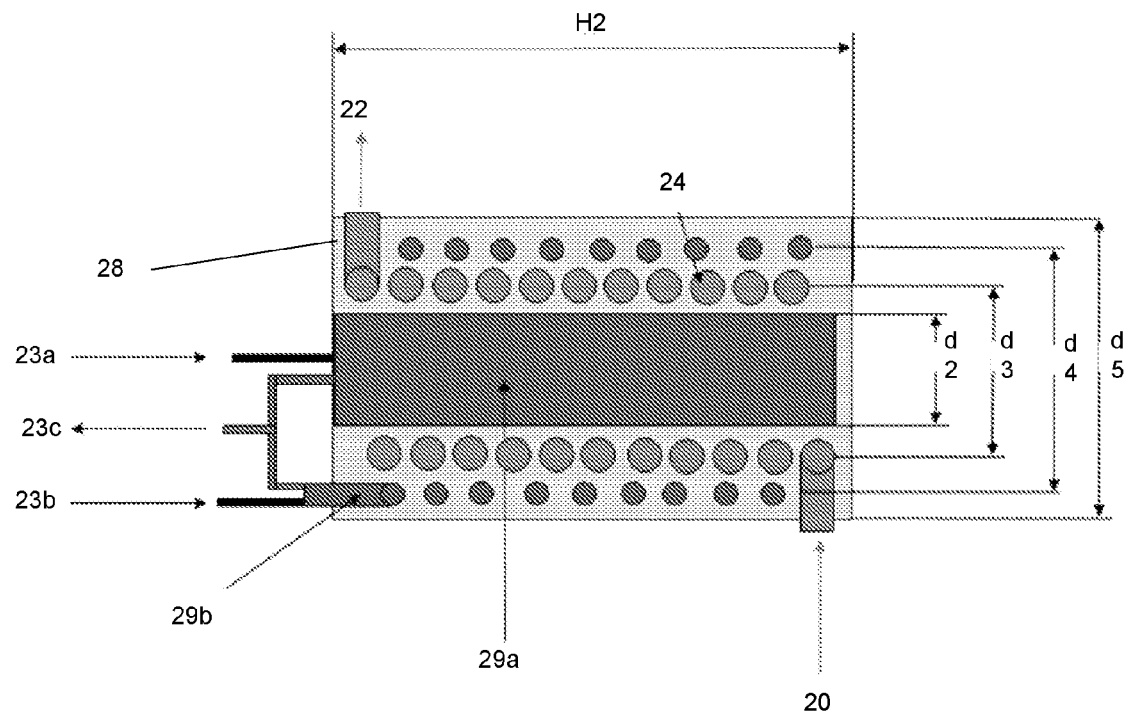

An inline heater according to another embodiment is illustrated on FIG. 2. The inline heater comprises a body 28 with an integrated water circuit. The body 28 may be made of aluminium: the aluminium body has a sufficient thermal capacity to dampen energy variations, though limited to minimise the heat-up time at start-up from room or rest temperature.

The water circuit comprises a liquid inlet 20, a liquid outlet 22, and a liquid pipe 24 in-between fluidically connecting the inlet to the outlet. Typically the liquid pipe has an helicoidal shape. The water pipe can be formed by a molded inox water pipe embedded in the body. The water pipe can also be formed by a coated liquid channel formed in the body. The external shape of the body illustrated on FIG. 2 is a cylinder, with a height H2 of 65 mm and an external diameter of d5 of 50 mm (d2=20 mm, d3=30 mm, d4=42 mm). The heater comprises an heating element 29 including a cylindrical heat cartridge 29a and a wrapped heat cartridge 29b.

The cylindrical heat cartridge 29a and the wrapped heat cartridge 29b are controlled by two electrical circuits so as to allow the activation/deactivation of the cylindrical heat cartridge 29a and the wrapped heat cartridge 29b independently. The cylindrical heat cartridge 29a is controlled by a first circuit 23a, 23b, whereas the wrapped heat cartridge 29b is controlled by a second circuit 23c, 23b, the two circuits sharing a common reference potential/neutral 23c. Each cartridge 29a, 29b is capable of delivering an heating power that is smaller than the heating power that the surface heating element is capable of delivering. As a consequence, a split of the heat power to multiple (typically 2 for the espresso applications, e.g. prepared from a capsule such as a Nespresso capsule) can be obtained to follow the Flicker standards. The power split between the two heating cartridge can be a 50%/50% repartition of the heating power between the circuits, or any repartition from 15%/85% to 85%/15%. The total heating power of the surface heating power of the surface heating element is typically comprised between 600 W and 2000 W.

Figure 3A:
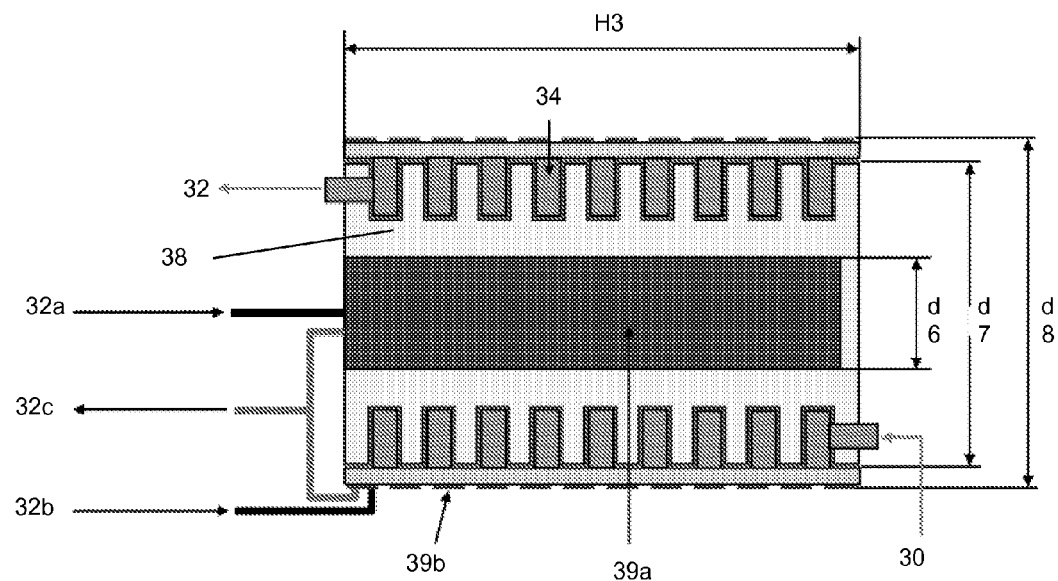
Figure 3B:
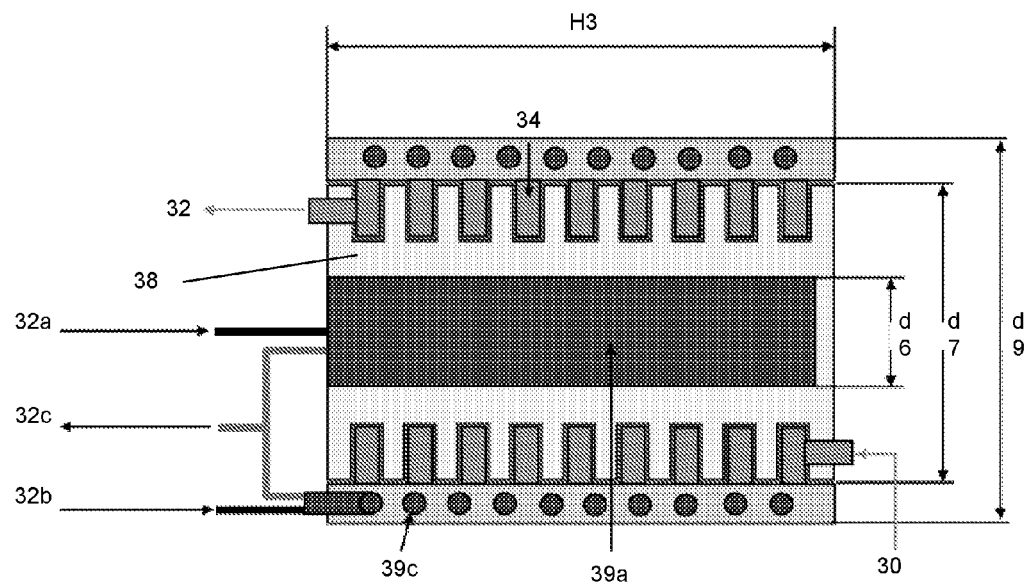
Figure 4:
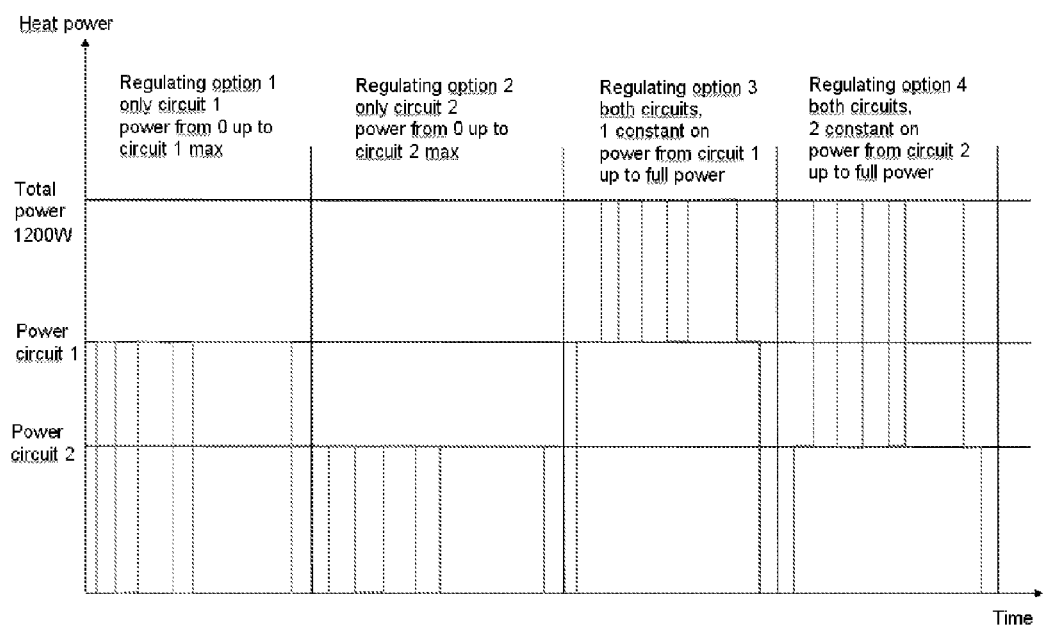

Inline heaters according to other embodiments are illustrated on FIGS. 3a and 3b. The inline heater comprises a body 38 with an integrated water circuit. The body 38 may be made of aluminium: the aluminium body has a sufficient thermal capacity to dampen energy variations, though limited to minimise the heat-up time at start-up from room or rest temperature.

The water circuit comprises a liquid inlet 30, a liquid outlet 32, and a liquid channel 34 in-between fluidically connecting the inlet to the outlet. Typically the liquid channel 34 is formed in the body 38. In particular, the liquid channel 34 is coated. The external shape of the body illustrated on FIG. 3a/3b is a cylinder, with a height H3 of 65 mm. For the embodiment illustrated in FIG. 3a, the body has an external diameter of d7 of 40 mm (d6=20 mm, d7=36 mm). For the embodiment illustrated in FIG. 3b, the body has an external diameter of d8 of 50 mm (d6=20 mm, d7=36 mm).

The heater comprises an heating element 39 including a cylindrical heat cartridge 39a.

The heating element 39 of the embodiment illustrated on FIG. 3b comprises a thick film heater 39b that is thermally and mechanically coupled to the body. The thick film may be printed on a steel cylinder which is mounted on the body.

The cylindrical heat cartridge 39a and the thick film heater 39b are controlled by two electrical circuits so as to allow the activation/deactivation of the cylindrical heat cartridge 39a and the thick film heater 39b independently. The cylindrical heat cartridge 39a is controlled by a first circuit 33a, 33b, whereas the thick film heater 39b is controlled by a second circuit 33c, 33b, the two circuits sharing a common reference potential/neutral 33c. Each element 39a, 39b is capable of delivering an heating power that is smaller than the heating power that the surface heating element is capable of delivering. As a consequence, a split of the heat power to multiple (typically 2 for the espresso applications, e.g. prepared from a capsule such as a Nespresso capsule) can be obtained to follow the Flicker standards. The power split between the two heating element can be a 50%/50% repartition of the heating power between the circuits, or any repartition from 15%/85% to 85%/15%. The total heating power of the surface heating element is typically comprised between 600 W and 2000 W.

The heating element 39 of the embodiment illustrated on FIG. 3b comprises a wrapped heat cartridge 39c. The wrapped heat cartridge 39c may be molded in metal cylinder mounted around the body. The cylindrical heat cartridge 39a and the wrapped heat cartridge 39c are controlled by two electrical circuits so as to allow the activation/deactivation of the cylindrical heat cartridge 39a and wrapped heat cartridge 39c independently. The cylindrical heat cartridge 39a is controlled by a first circuit 33a, 33b, whereas wrapped heat cartridge 39c is controlled by a second circuit 33c, 33b, the two circuits sharing a common reference potential/neutral 33c. Each element 39a, 39b is capable of delivering an heating power that is smaller than the heating power that the surface heating element is capable of delivering. As a consequence, a split of the heat power to multiple (typically 2 for the espresso applications, e.g. prepared from a capsule such as a Nespresso capsule) can be obtained to follow the Flicker standards. The power split between the two heating element can be a 50%/50% repartition of the heating power between the circuits, or any repartition from 15%/85% to 85%/15%. The total heating power of the surface heating element is typically comprised between 600 W and 2000 W.

Thermo Regulation:

The heat power will be distributed by switching on and off the two power circuits of a heater according to the invention as illustrated in FIGS. 1 to 3.

Different options are available for a heater with two different power circuits, such as 400 W/800 W.

The determination which regulation option is the best for a specific flow and water temperature target at the exit of the thermoblock will be made with a pre-calculation of the needed heat power:

$$\text{Power need} = \text{Water Flow} * (T_{exit} - T_{entry}) * \text{thermal capacity of water}$$

With this pre-calculation the optimal thermal regulation algorithm can be predetermined, and a smooth and precise temperature regulation can be achieved.

For respecting the Flicker standards, a simultaneous switching on or off of both circuits has to be avoided The invention may achieve the following improvements and provide the following advantages:

Decreased heat up time to operating temperature from room or rest temperature

Thermo regulation possible according to barrista espresso temperature quality standards and as well within Flicker public regulations.

Good regulation dynamics
Low mass (below 250 g total heater mass) Important features of the invention may include:
Two heating circuits allowing high quality thermo regulation;
Low thermal mass allowing fast heat up times;
Dynamics adjustable by adding or descreasing weight of alu body;
Specific know how for connection of thickfilm plate to aluminium heater body.

The invention claimed is:

1. A method for controlling a heater for a liquid food or beverage preparation machine, the liquid being circulated through the heater for brewing a food or beverage ingredient, the heater comprising: a body having an inlet, an outlet and a heating chamber extending therebetween, the inlet, outlet and heating chamber forming together a rigid passage for guiding the liquid circulating through the body; and a heater cooperating with the body for supplying heat into the heating chamber; and the heater comprises (i) at least two different types of heating elements selected from the group consisting of a thick film, a surface heating element, a heating cartridge selected from the group consisting of a cylindrical heating cartridge and a wrapped heating cartridge, and combinations thereof; and (ii) at least two electrical control circuits for independently activating and deactivating each heating element, wherein the heating elements are independently activated or deactivated comprising:

switching on and off the electrical control circuits, so as to avoid simultaneous switching on or off of both heating elements, wherein one or both of the heating elements are in direct contact with the body to enable heat to be conducted directly between the heating elements and the body.

2. The method of claim 1, wherein the step of switching on the electrical control circuits heats the liquid from a tap temperature of 10 to 30° C. to a brewing temperature of 80 to 100° C.

3. The method of claim 1, wherein the step of switching on the electrical control circuits heats the liquid from 20° C. to 90° C. in a heat up time of below 20 seconds.

4. The method of claim 1, wherein the heating power of each heating element is substantially identical.

5. The method of claim 1, wherein the heater comprises a resistive heater, the resistive heater comprising at least two resistive heating circuits, adapted to be coupled to the electrical control circuits.

6. The method of claim 5, wherein the resistive heater is a thick film printed on an inox plate which is soldered to the body.

* * * * *